US012227071B2

(12) United States Patent
Searle

(10) Patent No.: US 12,227,071 B2
(45) Date of Patent: Feb. 18, 2025

(54) VIDEO PROCESSING

(71) Applicant: BAE Systems plc, London (GB)

(72) Inventor: John Giles Searle, Brough (GB)

(73) Assignee: BAE Systems plc, London (GB)

( * ) Notice: Subject to any disclaimer, the term of this patent is extended or adjusted under 35 U.S.C. 154(b) by 238 days.

(21) Appl. No.: 17/919,143

(22) PCT Filed: Apr. 29, 2021

(86) PCT No.: PCT/GB2021/051032
§ 371 (c)(1),
(2) Date: Oct. 14, 2022

(87) PCT Pub. No.: WO2021/220002
PCT Pub. Date: Nov. 4, 2021

(65) Prior Publication Data
US 2023/0158887 A1 May 25, 2023

(30) Foreign Application Priority Data

Apr. 30, 2020 (EP) ..................................... 20275081
Apr. 30, 2020 (GB) ..................................... 2006346

(51) Int. Cl.
*B60K 35/00* (2024.01)
(52) U.S. Cl.
CPC ..................................... *B60K 35/00* (2013.01)
(58) Field of Classification Search
CPC ................................ B60K 35/00; G09G 5/397
See application file for complete search history.

(56) References Cited

U.S. PATENT DOCUMENTS

| 10,916,075 | B1* | 2/2021 | Webster | G09B 19/14 |
| 11,074,766 | B2* | 7/2021 | Dietz | G07C 5/085 |
| 2009/0326796 | A1* | 12/2009 | Prokhorov | G08G 1/167 |
| | | | | 701/532 |
| 2010/0234071 | A1* | 9/2010 | Shabtay | H04B 7/155 |
| | | | | 455/562.1 |
| 2014/0350753 | A1 | 11/2014 | Depape | |
| 2015/0239574 | A1 | 8/2015 | Ball | |
| 2016/0247253 | A1* | 8/2016 | Kim | G06T 1/20 |

(Continued)

FOREIGN PATENT DOCUMENTS

| EP | 1729256 A | 9/1929 |
| EP | 3082127 A1 | 10/2016 |

OTHER PUBLICATIONS

International Search Report and Written Opinion of PCT Appl. No. PCT/GB2021/051032 mail date Jul. 12, 2021, 26 pages.

(Continued)

*Primary Examiner* — Long T Tran
(74) *Attorney, Agent, or Firm* — Maine Cernota & Curran

(57) ABSTRACT

A video processing system (100) comprises at least one controller (102) configured to receive a plurality of video data from a respective plurality of video data sources (106, 208). The system can assign one of a plurality of hierarchical display layers to each of the plurality of video data, and generate an output video for display, the output video comprising at least a portion of each of the plurality of video data layered according to the assigned hierarchical display layers. The plurality of hierarchical display layers is based on a respective plurality of safety/security levels defined in a safety/security standard.

17 Claims, 5 Drawing Sheets

(56) References Cited

U.S. PATENT DOCUMENTS

| | | | | |
|---|---|---|---|---|
| 2016/0267335 A1* | 9/2016 | Hampiholi | ............ | G08B 21/06 |
| 2019/0212749 A1* | 7/2019 | Chen | .................... | B62D 15/025 |
| 2019/0286115 A1 | 9/2019 | Wang | | |
| 2020/0023838 A1* | 1/2020 | Zhang | ................ | B60W 30/095 |
| 2020/0369294 A1* | 11/2020 | Jeon | ................ | B60W 60/00274 |
| 2021/0034602 A1* | 2/2021 | Levacher | ............ | G06F 16/2365 |
| 2021/0116907 A1* | 4/2021 | Altman | ............ | B60W 60/0015 |

OTHER PUBLICATIONS

Great Britain Search Report of Application GB 20275081.6 mail date Oct. 29, 2020, 3 pages.
European Search Report of Application EP 20275081.6 mail date Jan. 7, 2020, 17 pages.
International Preliminary Report on Patentability of PCT Application PCT/GB2021/051032 mail date Nov. 1, 2022, 20 pages.

* cited by examiner

VIDEO PROCESSING

RELATED APPLICATIONS

This application is a national phase application filed under 35 USC § 371 of PCT Application No. PCT/GB2021/051032 with an international filing date of Apr. 29, 2021, which claims priority of GB Patent Application 2006346.7 filed Apr. 30, 2020 and EP patent application No. 20275081.6 filed Apr. 30, 2020. All of these applications are incorporated herein by reference in their entirety for all purposes.

FIELD OF THE INVENTION

The present invention relates to video processing.

BACKGROUND OF THE INVENTION

As technology advances there is a desire to consolidate previously disparate systems into fewer and more integrated systems. Whilst this reduces size, weight, power and costs of equipment, extra wiring, etc, it can create problems in terms of providing and proving separation of either safety or security related functions which are at differing levels of required integrity.

Previously, whole systems/computers would have been required to be developed to the highest integrity thereby having an increased cost. The ability to develop systems with differing levels of safety/security provides an opportunity to reduce costs of development. The levels of safety/security may be defined by national, regional or international standards.

A related issue is the drive to reduce the number of user displays to a minimum whilst increasing the size to allow for flexibility. This decrease in independent displays, however, can cause problems where regulations and standards require separation of differing display integrity levels.

Embodiments of the present invention are intended to address at least some of the above technical problems.

SUMMARY OF THE INVENTION

According to one aspect of the present invention there is provided a video processing system comprising:
  at least one controller configured to:
  receive a plurality of video data from a respective plurality of video data sources;
  assign one of a plurality of hierarchical display layers to each of the plurality of video data, and
  generate an output video for display, the output video comprising at least a portion of each of the plurality of video data layered according to the assigned hierarchical display layers,
    wherein the plurality of hierarchical display layers is based on a respective plurality of safety/security levels defined in a safety/security standard.

The at least one controller may be configured to generate the output video by merging the plurality of video data in in a top down manner such that the video data assigned a higher said hierarchical display layer is arranged on top of the video data assigned a lower said hierarchical display layer.

The at least one controller may be further configured to obtain video display control data comprising information describing how the plurality of hierarchical display layers are assigned dependent on the plurality of video data sources.

The video display control data may further comprise image manipulation instructions for each of the plurality of hierarchical display layers. The image manipulation instructions may be selected from a set comprising: combine, merge, scale and/or translate instructions. The image manipulation instructions may identify at least one said portion of the video data to be manipulated.

The system may comprise a first processing component comprising a first CPU and a first GPU, and a second processing component comprising a second CPU and a second GPU. The first processing component may be configured to be connected to at least said one video data source and to process safety/security related video data. The second processing component may be configured to process non-safety/security related video data.

The first processing component may further comprise a separate video switching, mixing and control component configured to process the plurality of video data. The video switching, mixing and control component may comprise a Field Programmable Gate Array, FPGA, or an Application Specific Integrated Circuit, ASIC.

The CPU of the first processing component may be configured to provide graphics generation instructions to the GPU of the first processing component, wherein the GPU comprises one of the video data sources and uses the graphics generation instructions to generate one of the plurality of safety/security related video data. The CPU of the second processing component may provide graphics generation instructions to the GPU of the second processing component, wherein the GPU comprises one of the video data sources and uses the graphics generation instructions to generate one of the plurality of non-safety/security related video data.

The CPU of the first processing component may provide the image manipulation instructions to the video switching, mixing and control component.

At least one of the plurality of video data may be received from an external source via a video input/interface.

In some cases, a predetermined pixel value is set as a chroma-key colour value and pixels of the video data having the chroma-key colour value in a said assigned hierarchical display layer may be replaced by values of corresponding pixels in a lower hierarchical display layer. Thus, interference from lower layer video data may prevented by using a non-chroma key colour in the video data to ensure a solid background is displayed for higher layers of the video.

The safety levels may comprise DAL or SILs.

The system may further comprise a display device or an interface for a display device.

According to another aspect of the present invention there is provided a (computer-implemented) method of processing video, the method comprising:
  receiving a plurality of video data from a respective plurality of video data sources;
  assigning one of a plurality of hierarchical display layers to each of the plurality of video data, and
  generating an output video for display, the output video comprising at least a portion of each of the plurality of video data layered according to the assigned hierarchical display layers,
    wherein the plurality of hierarchical display layers is based on a respective plurality of safety/security levels defined in a safety/security standard.

According to another aspect there is provided a controller configurable to transfer instructions to a video switching, mixing and control component substantially as described herein.

According to another aspect there is provided a computer program product comprising instructions which, when the program is executed by a computer, cause the computer to carry out methods substantially as described herein.

According to other aspects of the present invention there is provided a computer device configured to execute a method substantially as described herein.

According to another aspect of the present invention there is provided a vehicle, such as an aircraft, comprising a video data processing system substantially as described herein.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF THE FIGURES

Figure 1:
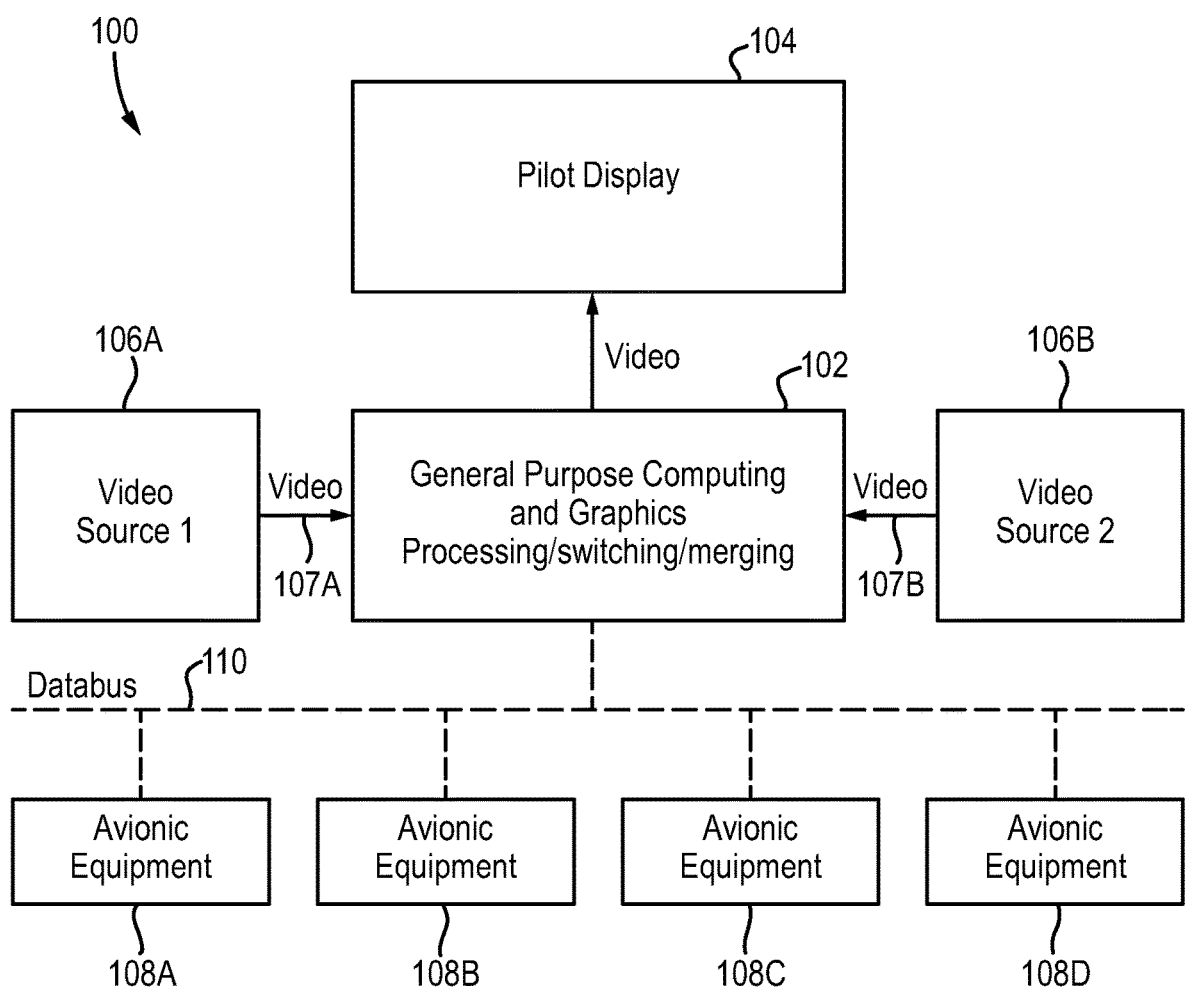
FIG. 1 is an overview of an example embodiment.

FIG. 1 is a diagram of an example video processing system 100. The system is designed to take data from avionics equipment, such as radios, inertial navigation sensors, radio navigation equipment and height sensors, etc, and process it for display to a pilot so that they may control the appropriate equipment or use the displayed information to fly the aircraft.

Although the illustrated embodiment relates to an aircraft system, it will be appreciated that alternative embodiments can be used with any system or vehicle (airborne, land, maritime based) which requires differing levels of display integrity either from a safety or security perspective to be displayed on a single display surface. A non-exhaustive list of examples includes: military aircraft (e.g. Tempest™, Typhoon™, Hawk™), ships, submarines, land vehicles, civil airliners, power stations, automotive, industrial controllers, autonomous vehicle controller stations (e.g. Unmanned Air Vehicle Ground Controller Station).

The example system 100 of FIG. 1 comprises a controller/processor unit 102 configured as a general purpose computing and graphics processor that can perform processing, including switching/merging operations, on video data. The processor unit can be associated at least one internal memory (e.g. Random Access Memory) and can also have one or more interfaces that allow communication with other devices via any suitable wired/wireless interface and/or communications network. The internal memory can store data and instructions for processing by the processor(s). The processor unit may also include/be associated with other conventional features, such as non-volatile storage device (s), a user interface, and so on, which need not be described herein in detail.

Video output generated by the processor unit 102 can be displayed on one or more display device 104. The display device(s) can be based on any suitable technology, e.g. LED, OLED, LCD, etc. The processor unit can receive a plurality of video data from a respective plurality of internal and/or external video data sources. The external video data sources may be connected to the processor unit by any suitable wired or wireless interface(s), e.g. HDMI. In the example first 106A and second 106B external video data sources are connected to the processor unit via first 107A and second 107B respective interfaces. These sources may comprise external video feeds from equipment such as a video camera or a Forward Looking Infra-Red Camera. It will be understood that any number of video sources/interfaces can be used in embodiments. The video sources/interfaces may be of the same or different types.

In the example the processor unit 102 also processes video data that is generated using signals from one or more avionic equipment components 108A-108D that are in communication with it by means of a data bus 110. The processor unit may be configured to combine one or more video/graphics channels generated internally (by General Purpose Computing) and the external video inputs into one output video for display on the display device 104 in the manner described herein. The video data may be received from the various sources substantially simultaneously.

The data received by the processor unit 102 may be processed based on recognized safety or security standards. For instance, data received from one or more of the data sources may be treated in a manner that corresponds to a particular level of an international standard that defines a plurality of hierarchical levels. Data from a particular source may be in accordance with one of those standard levels, which affects the manner in which it is processed/displayed. For instance, the received data can have differing safety integrity levels (SILs) as apportioned through a system safety analysis process following recognised standards, such as ARP-4754/ARP-4761 or DEF-STAN 00-055. To give another example, standards DO-254 and EUROCAE ED-80 define five Design Assurance Levels, commonly referred to as DAL, that describe how critical components are for safe flight. The different DAL levels progressively describe components whose importance ranges from extremely important to trivial for safe flight. For example, DAL A, the highest importance/integrity level, describes flight electronics hardware whose failure or malfunction could cause a catastrophic, hazardous, or severe condition that would result in the deaths of everyone aboard the aircraft. In other embodiments the data may be processed based on data security standards that define hierarchical levels. Examples of alternative safety/security standards that can be used in alternative embodiments include: DO-326A/ED-202A, NIST Special Publication 800-53 (Security), and IEC 61508, IEC 62279, IEC 61511, IEC 61513 (Safety).

Figure 2:
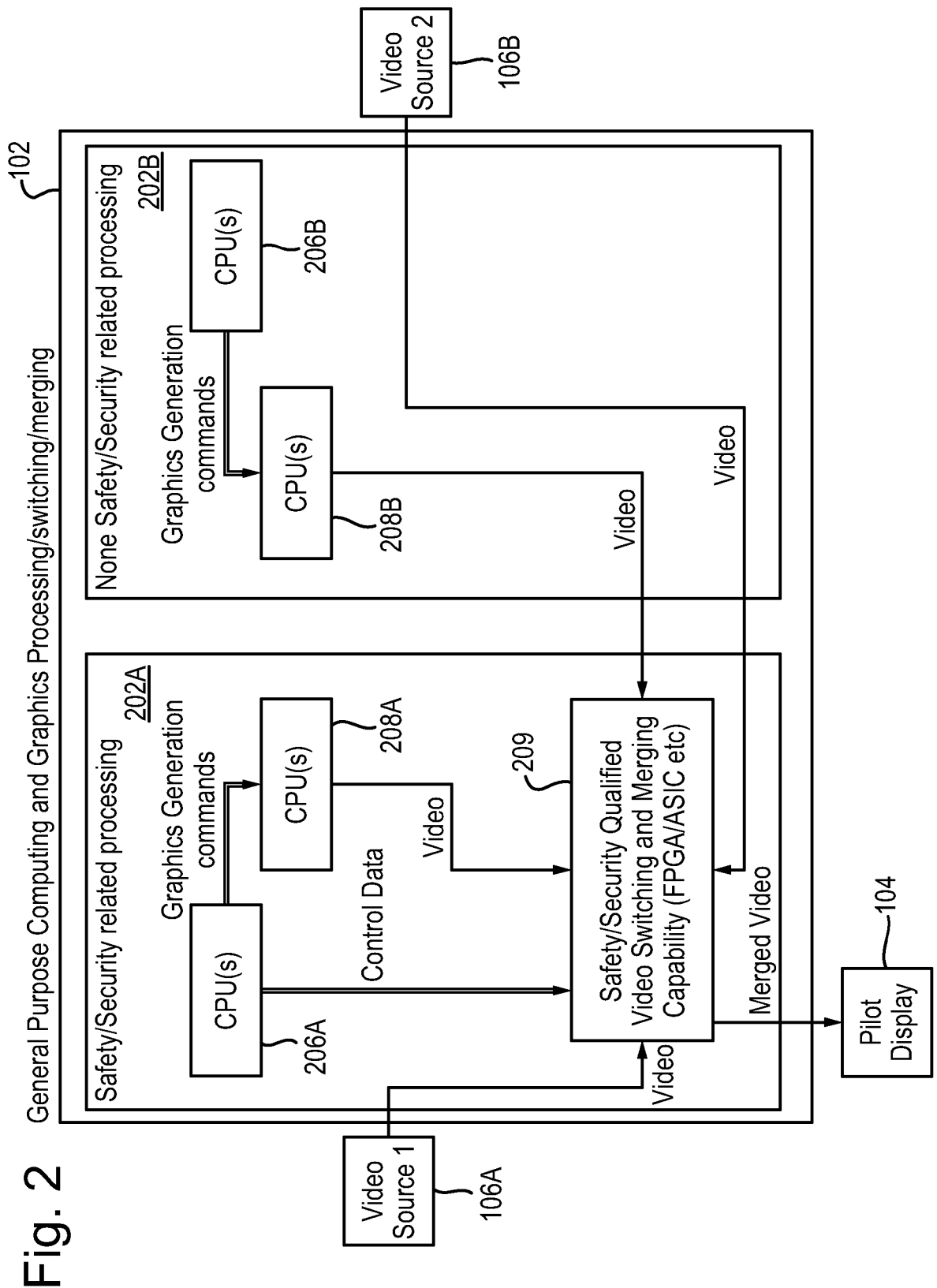
FIG. 2 shows the embodiment in more detail.

FIG. 2 schematically illustrates the logical internals of the processor unit 102 configured to operate General Purpose Computing and Graphics Processing, where a Graphics Processing Unit (GPU) is used to perform computation in applications conventionally performed by a Central Processing Unit (CPU). GPU processing is very efficient, high performance and low latency and may avoid negatively affecting the performance of existing applications. The processor unit can provide a switching/merging device/capability, including Video Switching, Mixing & Control (VSM&C).

The processor unit 102 can contain computer processing and graphics generation components within two physically separate hardware components 202A, 202B. Each component 202A, 202B can comprise a minimum of one circuit board (i.e. all on the same board), but may also be comprised of multiple circuit boards, e.g. CPU and GPU contained on separate circuit boards. The first hardware component 202A can be intended to process safety/security-related data (e.g. data that should be processed in accordance with a recognised safety/security standard), whilst the second hardware component 202B can process non-safety/security data. This design can prevent the no-integrity, non-safety/security processing from interfering with the safety/security processing, which would invalidate safety requirements.

The safety/security-related processing component 202A comprises a CPU 206A and a GPU 208A, as well as a component 209 configured to provide a safety/security qualified video switching and merging capability. The CPU may be run a certifiable operating system, such as Wind River™ VxWorks653 or Green Hills™ Integrity-178, for example. The component 209 may comprise an FPGA or ASIC, or any other suitable controller or processor, configured to perform video processing operations on a plurality of received video data. In general, embodiments may use any suitable means, including circuits, processors, microprocessors, microcontrollers, ASICs, FPGAs, etc, for implementing system components.

The non-safety/security-related processing component 2026 comprises its own CPU 206B and GPU 208B. Video data from the non-safety/security related GPU 208B and the external video source 106 associated with the safety/security-related processing component 202B can also be transferred to the component 209.

The component 209 contained within the safety/security-related processing hardware 202A can be configured to provide a video manipulation capability that is able to combine, merge, scale and translate different video inputs into a single output video. This capability can be controlled by safety/security-related software running on the CPU 206A. The hardware within the safety/security-related component is normally developed to the highest integrity level as allocated from the system safety process, e.g. DO-254 DAL A, using known commercial video techniques and mechanisms. Embodiments can advantageously provide the separation of concerns for the processing and graphics generation along with the use of the Safety/Security Qualified Video Switching and Merging Capability (via FPGA/ASIC or equivalent) controlled by the safety/security related processor to configure any required mixing scenario.

In use, the CPU 206A of the safety/security processing component 202A can produce graphics generation commands that it transfers to the GPU 208A. These commands can control how the GPU generates output video, such as real-time navigational displays, that is based on data received from one or more of the avionics components 108. The GPU 208A can generate video data that is transferred to the component 209 and is treated as a safety/security-related video data source. Similarly, the CPU 206B of the non-safety/security processing component 202B can control the GPU 208B to generate video data that is also transferred to the component 209, but is treated as a non-safety/security-related video data source. The component 209 receives the plurality of video data received from the GPU 208A, the GPU 208B and any external video sources 106A, 1066 and processes the data to generate output video that can be displayed on the display device 104.

Figure 3:
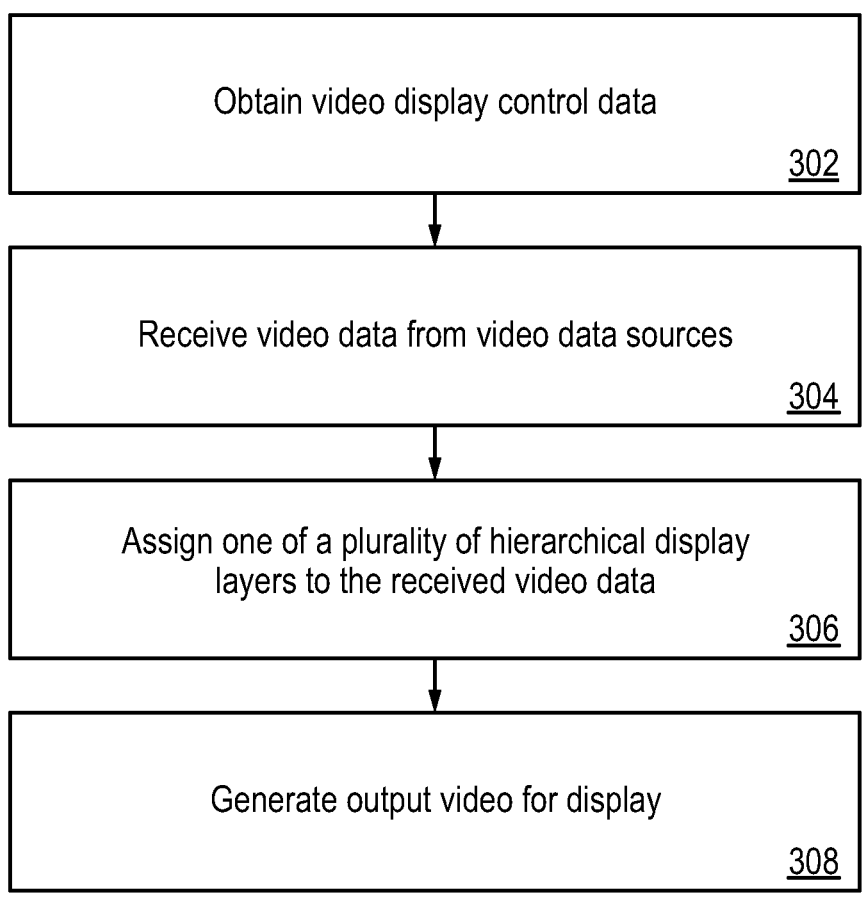
FIG. 3 is a flowchart showing examples of steps performed by the embodiment.

FIG. 3 is a flowchart illustrating steps that can be performed by the video processing system 100. The steps will typically be controlled by a processor in the processor unit 102, e.g. the CPU 206A of the safety/security processing component 202A, but it will be understood that one or more other processor(s) may perform at least one of the steps in alternative embodiments.

At step 302 the processor unit 102 can obtain video display control data that can be used to control how output video data for display is generated. The video display control data may be stored in an internal memory associated with the processor unit, or may be transferred from an external storage, device or communication link. The video display control data may be generated by, for example, an administrator user of the video processing system 100 using an application or data editor. This can allow the administrator user to at least assign a display layer to the video data received from each of the various (internal/external) video data sources and, optionally, to specify additional video manipulation instructions that can be executed on the video data to generate the output video. At least some of the hierarchical display layers can correspond to data that is treated according to a particular safety/security level defined by a safety/security standard. Thus, if a particular video data source is known to provide video data that is based on information treated in accordance with a particular level of the standard then the hierarchical display layer that has been designed to correspond to that standard level can be assigned to it. For instance, a video data source that deals with the highest level of data according to the standard (e.g. DAL A) can be assigned with the highest display layer; the video data source that deals with the second highest level of data according to the standard (e.g. DAL B) can be assigned with the second highest display layer, and so on.

Typically, the video display control data will define at least a plurality of hierarchical display layers. Layers are known in image/video editing and can separate different elements of a video/image. Layers can represent a part of an image/video, either as pixels or as modification instructions, and may be stacked/ordered to determine the appearance of the final image/video. Operations can be performed on layers, including stacking and merging. Layers can be partially obscured allowing portions of images within a layer to be hidden or shown in a translucent manner within another image. Layers can also be used to combine two or more images into a single image. The video display control data can contain information that is used to assign one of the plurality of hierarchical display layers to video data that is received from different video data sources of the system. A basic example is shown in the table below:

| Display layer | Data source |
| --- | --- |
| 1 | Safety/security-related GPU 208A (graphics generation commands from CPU 206A based on signals from one or more of avionic equipment components 108A-108D) |
| 2 | Safety/security-related external video source 106A |
| 3 | Non-safety/security-related GPU 208B (graphics generation commands from CPU 206B) |
| 4 | Non-safety/security-related external video source 106B |

The video display control data may further comprise additional data that can be used to control how the plurality of video data will be incorporated into the output video data. For instance, the additional data may indicate how portions of individual ones of the video data can be arranged, such as shown in the examples discussed below.

At step 304, the processor unit 102 can receive the plurality of video data to be processed. The video data may be received from various sources internal or external to the processor unit, e.g. as indicated in the example table above.

At step 306, the processor unit 102 can assign one of the plurality of hierarchical display layers to each of the received plurality of video data using the video display control data, e.g. as indicated in the example table above.

At step 308, the processor unit 102 can generate an output video for display. The output video, typically generated by the component 209, comprises at least a portion of each the plurality of video data ordered/arranged/layered according to the assigned hierarchical display layers. The output video generation can also involve additional video processing based on the additional information included in the video display control data. For instance, operations such as merge or combine may be performed on at least a portion of at least one of the plurality of video data, such as shown in the examples discussed below.

Figure 4:
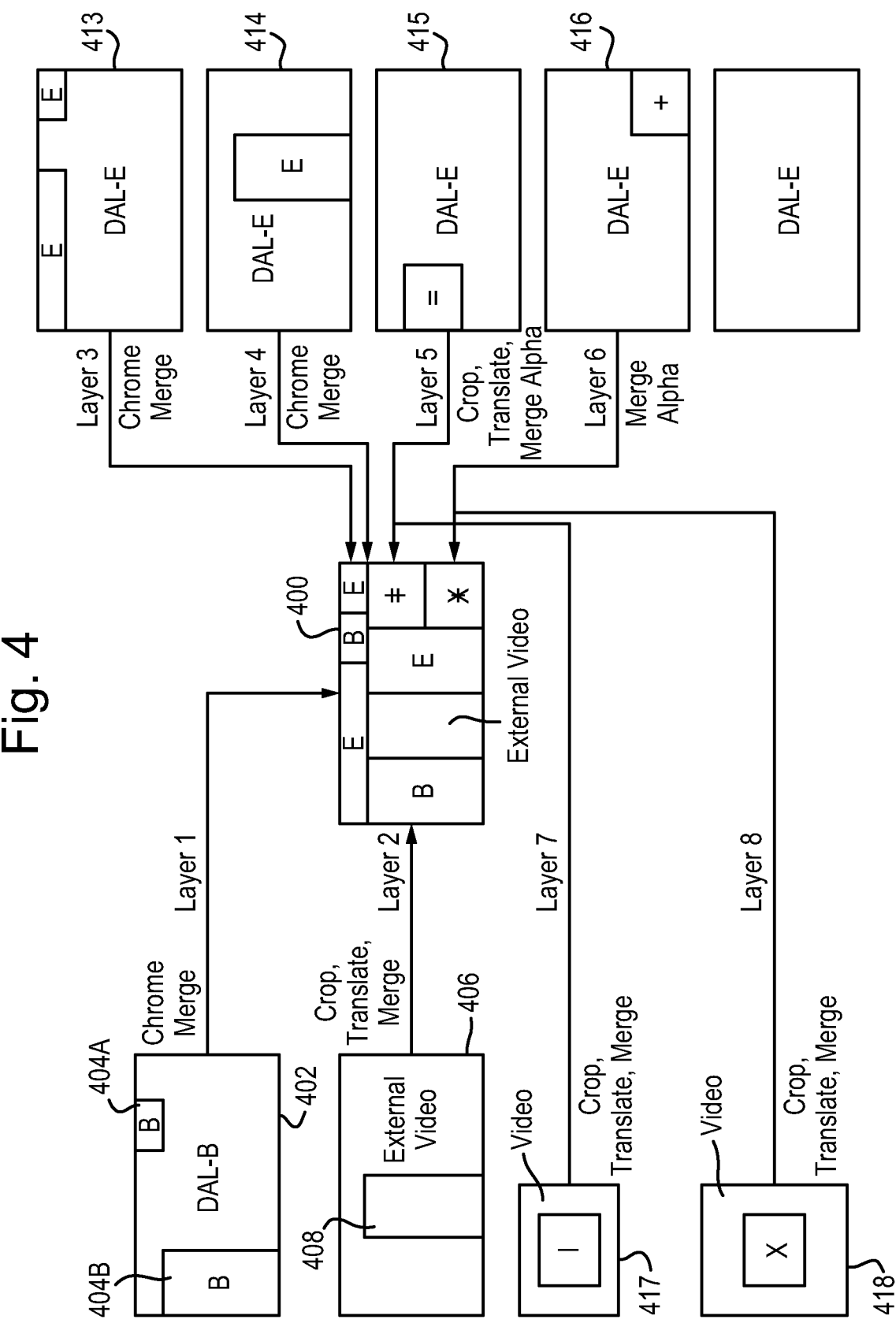
FIG. 4 illustrates a first example of output video generation.

FIG. 4 illustrates a first example of how a plurality of video data received from both internal and external sources can be manipulated using operations, such as cropping, scaling, translation, chroma keying, etc, to generate an output video 400. In the example, first video data 402 can comprise video images received from the GPU 208A and generated based on signals from one or more of the avionics components 108A-108B. The first video data is designated the highest/topmost layer 1 amongst the hierarchical display layers of the output video and corresponds to safety/security level DAL-B as defined by the relevant safety/security standard (DAL-B, rather than DAL-A, is set as the highest safety/security level expected to be processed by the system according to the video display control data of the example).

The video display control data can also contain information regarding further operations that can be performed on the received video data before/when it is added to the output video. In the example first 404A and second 404B portions of the first video data 402 should appear in layer 1 of the output video after chroma key and merge operations have been performed on them. The video display control data can contain details for such manipulation operations, e.g. coordinates of the portion(s), parameters for the specific operations, and so on. The CPU 206A can then use this information to provide instructions to the component 209 for it to generate the output video.

Second video data 406 can comprise video data from the first external video source 106A. The second video data is designated as layer 2 amongst the hierarchical display layers of the output video and a portion 408 of the second video should be inserted in the output video. The external video source may have an associated safety/security level, e.g. DAL, and therefore be safety related. In other cases, the display layer may not directly correspond to a particular safety/security level of the standard, but the administrator user uses knowledge of the system to create display control data where a particular video data source is the second most important source in terms of safety/security.

The example of FIG. 4 also shows how portions of further received video data 413-418 (to be designated as layers 3-8 amongst the hierarchical display layers of the output video) can be manipulated and merged to generate the output video 400. If video data is not received from a particular source then that layer can be skipped/omitted from the output video.

Figure 5:
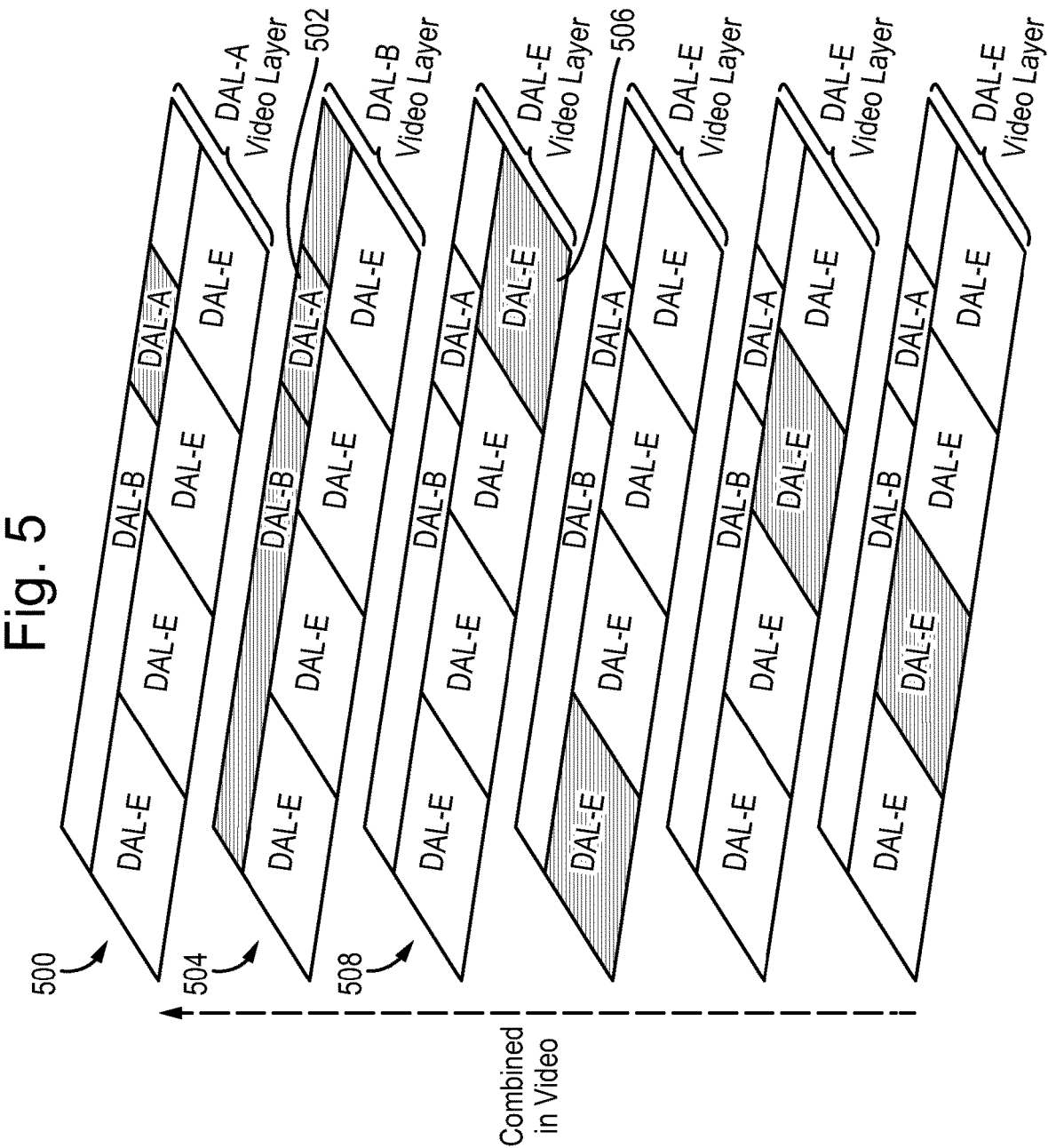
FIG. 5 illustrates another example of output video generation.

FIG. 5 illustrates another example of an output video 500 being generated. For the avoidance of doubt, FIGS. 4 and 5 do not show the same scenario as they combine different numbers of video data inputs/channels. The merging of layers based on received input video data can be done in a top down priority manner such that the higher safety/security level information should be always arranged on top so that lower, or no integrity graphics, cannot overwrite or interfere with higher priority graphics/information. For instance, layer 1 (which corresponds to DAL A information), 500 overlays layer 2, 504 (which corresponds to DAL B information) at location 502 and this will be layered on top of layer 3, 508 (which corresponds to DAL E information). Interference from background/lower layer video graphics can be prevented where appropriate by using a non-chroma key colour to ensure a solid background is displayed for the higher integrity/level portions of the displayed video. The chroma key colour is applied using the generating application's graphics generations commands and the component 209 replaces that colour with the lower layer's colours on a pixel by pixel basis. This, in effect for each pixel, works from the lowest layer replacing each pixel as required up through to the top layer, if applicable. If no chroma-key is present then this replaces the pixel. Thus, the RGB colour of a pixel is replaced for a different value to provide a different background; for example, RGB (0, 255, 0) might be used as a chroma key and any pixel in the layers of the video having that value can be replaced by the corresponding pixel in the lower layer.

In some cases more than one video source may be based on information that is at the same standard level (e.g. multiple videos all based on DAL E level information as shown in FIG. 5). Embodiments can control how the video data from such multiple sources will be displayed in the output video. For instance, specific (e.g. non-overlapping) portions of the different videos may be combined to form a single layer.

The skilled person will appreciate that embodiments of the components described herein can be implemented using any suitable software applications, programming languages, data editors, etc, and may be represented/stored/processed using any suitable data structures, and so on. It will also be understood that the steps described herein as part of the detailed embodiments may be re-ordered, omitted and/or repeated. Additional steps may also be performed. Some steps may be performed concurrently instead of sequentially.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A video processing system comprising at least one controller configured to:
   receive a plurality of video data inputs from a respective plurality of video data sources;
   obtain video display control data from a first CPU that is distinct from the video data sources, said video display control data comprising information describing how a plurality of hierarchical display layers are to be assigned to the plurality of video data sources, said video control data further comprising manipulation instructions for each of the plurality of hierarchical display layers;
   assign one of the plurality of hierarchical display layers to each of the plurality of video data inputs at least in part according to the video display control data; and
   generate an output video for display, the output video comprising at least a portion of each of the plurality of video data inputs layered according to the assigned hierarchical display layers and manipulated according to the manipulation instructions;
   wherein the plurality of hierarchical display layers is based on a respective plurality of safety/security levels defined in a safety/security standard.

2. The system according to claim 1, wherein the at least one controller is configured to generate the output video by merging the plurality of video data inputs in a top down manner, such that those of the video data inputs that are assigned to higher of said hierarchical display layers are arranged on top of those of the video data inputs that are assigned to lower of said hierarchical display layers.

3. The system according to claim 1, wherein at least one of the manipulation instructions is selected from a set comprising: combine, merge, scale, and translate instructions.

4. The system according to claim 3, wherein the manipulation instructions identify at least one said portion of the video data inputs to be manipulated.

5. The system according to claim 3, further comprising:
   a first processing component comprising the first CPU and a first GPU, and
   a second processing component comprising a second CPU and a second GPU,
   wherein the first processing component is configured to process safety/security related video data inputs and the second processing component is configured to process non-safety/security related video data inputs.

6. The system according to claim 5, wherein the first processing component further comprises a separate video switching, mixing and control component comprising a Field Programmable Gate Array, FPGA, an Application Specific Integrated Circuit, ASIC, a first processing component CPU or a first processing component GPU configured to process the plurality of video data inputs.

7. The system according to claim 6, wherein:
   the first CPU of the first processing component is configured to provide graphics generation instructions to the first GPU of the first processing component to generate the safety/security related video data inputs, and
   the CPU of the second processing component is configured to provide graphics generation instructions to the GPU of the second processing component to generate the non-safety/security related video data inputs.

8. The system according to claim 5, wherein the first CPU of the first processing component is configured provide the image manipulation instructions to the video switching, mixing and control component.

9. The system according to claim 1, wherein a predetermined pixel value is set as a chroma-key colour value and pixels of the video data inputs having the chroma-key colour value in a said assigned hierarchical display layer are replaced by values of corresponding pixels in a lower hierarchical display layer.

10. The system according to claim 1, wherein the safety/security levels comprise safety integrity levels, SILs, according to the ARP-4754/ARP-4761 or DEF-STAN 00-055 standard, or Design Assurance Levels, DALs, according to the DO-254 or EUROCAE ED-80 standard.

11. A vehicle including a video processing system according to claim 1.

12. The vehicle according to claim 11 wherein the vehicle is an airborne, land or maritime based vehicle.

13. The vehicle according to claim 11, wherein the vehicle is an autonomous vehicle.

14. The video processing system of claim 1, wherein the video display control data is generated by a user of the video processing system.

15. The video processing system of claim 1, wherein the manipulation instructions comprise at least one of scale instructions and translate instructions.

16. A video processing method comprising:
   receiving a plurality of video data inputs from a respective plurality of video data sources;
   assigning one of a plurality of hierarchical display layers to each of the plurality of video data inputs, and
   generating an output video for display, the output video comprising at least a portion of each of the plurality of video data inputs layered according to the assigned hierarchical display layers,
   wherein the plurality of hierarchical display layers is based on a respective plurality of safety/security levels defined in a safety/security standard.

17. Non-transient media containing instructions which, when executed by a computing device, cause the computing device to carry out the method of claim 16.

* * * * *